Figures 6, 7:
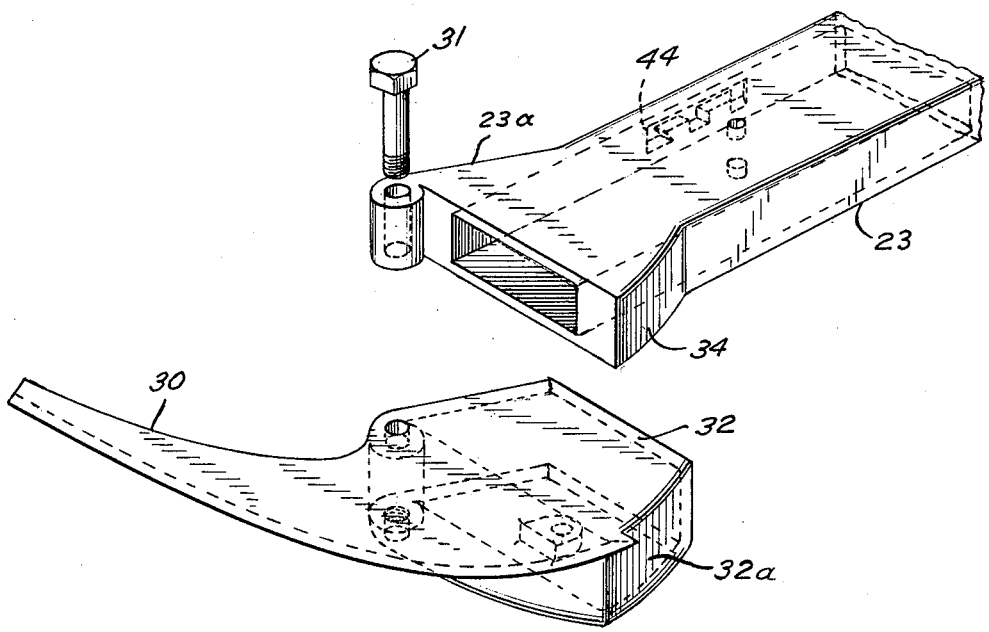

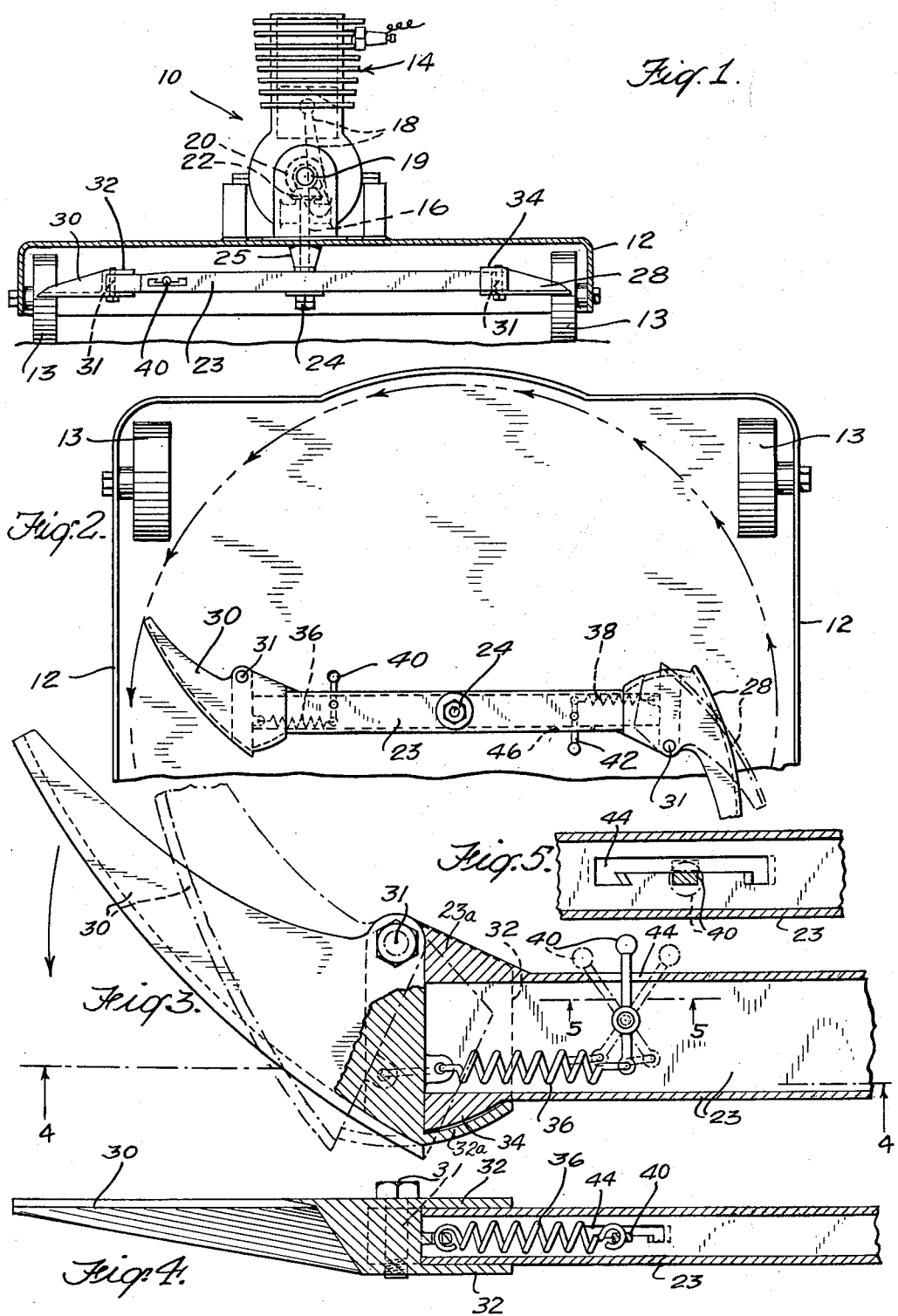

May 25, 1965 W. B. HARLOFF 3,184,907
POWER MOWER

Filed March 16, 1964 2 Sheets-Sheet 2

INVENTOR
WERNER B. HARLOFF
BY
ATTORNEYS

United States Patent Office 3,184,907
Patented May 25, 1965

3,184,907
POWER MOWER
Werner B. Harloff, 40 Mar-kan Drive, Northport, N.Y.
Filed Mar. 16, 1964, Ser. No. 352,046
2 Claims. (Cl. 56—295)

This invention relates to power mowers and the like and, in particular, to mowers which are provided with exterior cutting blades having some freedom of action with respect to its mounting means.

One object of the invention is to provide a mowing machine capable of sustained cutting under adverse conditions.

According to the invention the blades are revolved by a rotating member in a plane parallel to the ground, being carried thereby in such a manner as to enhance their cutting ability. It has been found in practice that the cutting efficiency of mowers is diminished to the extent that the blades mat instead of cut the grass. It is the desideratum of the invention to provide a mower which during operation reduces matting to a minimum. To this end the mower is equipped with special means for achieving a versatility of blade motion which permits the blade to cut straight through the grass under normal conditions or to slice across as well as through the grass when abnormal resistance is encountered. In general, the capacity of the mower blades to adapt to the condition of the grass or other object and to orient their cutting surfaces and paths accordingly is inherent to the invention. Then follows a specific description of one embodiment of the invention which is possessed of this capacity being illustrated in the accompanying drawings, in which:

FIGURE 1 is a view in elevation of the mower;
FIGURE 2 is a bottom plan of the same;
FIGURE 3 is a detail showing the hinged blade construction;
FIGURE 4 is a section taken on the line 4—4 of FIGURE 3;
FIGURE 5 is a detail illustrating the three position stop for the blade spring arm;
FIGURE 6 is a perspective showing one end of the blade arm;
FIGURE 7 is a perspective showing the mower blade.

Referring to the drawings, the mower 10 comprises a main frame 12 having wheels 13 and supporting an internal combustion engine 14. Bevel gear shaft 16 driven by connecting rod 18 and crank shaft 19 through bevel gears 20 and 22 is in driving connection with blade carrier arm 23. The arm is rigidly secured on the shaft between nut 24 and shaft bearing 25 and, is disposed horizontal to the ground.

Blades 28 and 30 are hingedly connected on threaded pins 31 to the respective ends of the carrier arm 23 the blades being arcuate extensions of bifurcated shields 32 and 34, respectively, which slidably embrace the ends of the carrier arm. The ends 23a of the arm 23 are outwardly flared, the shape of the shields 32 having a complementary taper. A vertical side plate 32a of the shields prevents the blades from being rotated counter-clockwise beyond the normal position of the blade as shown in full lines in FIGURE 3. The carrier arm is hollow and there is disposed in each end thereof tension springs 36 and 38 the outer ends of which are secured to the shield portions of the arcuate blades. The inner ends of the springs 36 and 38 are attached to tension adjusting levers 40 and 42 respectively, which extend through slots 44 and 46, respectively, in the carrier member, being pivotally mounted within the arm 23. The slots are provided with three shoulder stop positions for the levers which can thus be manually set according to cutting conditions.

It can be seen that as the arm 23 rotates the blades will be permitted to pivot on their pins 31 when more difficult to cut objects are encountered. The blades are however maintained in cutting contact by their tension springs. The carrier arm, of course, continues to revolve. As a consequence, the blades are drawn across the object in a slicing motion which greatly enhances their capacity under such conditions to cut through the object as opposed to rigidly passing over the object which in the case of a grass clump would merely become matted. The yielding capacity of the blades minimizes the risk of severe damage to their cutting edges when hard objects are struck.

Various modifications of the invention may be effected by persons skilled in the art without departing from the scope and principle of invention as defined in the appended claims.

What is claimed is:
1. A power mower having a revolvable hollow arm disposed substantially horizontal to the ground over which the mower is operated, means for revolving said arm, a blade hingedly connected to each end of said arm, each of said blades being arcuate in shape, a spring disposed within the arm, one end of said spring being connected within the arm and the other end being connected to said blade.
2. A power mower as defined in claim 1 wherein there are provided means for adjusting the tension on said spring.

References Cited by the Examiner
UNITED STATES PATENTS
2,529,870 11/50 Golasky _____ 56—295 X
2,859,582 11/58 Babcock _____ 56—295

ANTONIO F. GUIDA, Acting Primary Examiner.
RUSSELL R. KINSEY, Examiner.